(12) United States Patent
Nakayama (10) Patent No.: US 6,938,020 B2
(45) Date of Patent: Aug. 30, 2005

(54) MEMORY RENTAL SERVICE SYSTEM IN INTELLIGENT AUTHENTICATION UNIT

(75) Inventor: Keisuke Nakayama, Tokyo (JP)

(73) Assignee: Systemneeds Inc., Tokyo (JP)

( * ) Notice: Subject to any disclaimer, the term of this patent is extended or adjusted under 35 U.S.C. 154(b) by 512 days.

(21) Appl. No.: 10/218,660

(22) Filed: Aug. 15, 2002

(65) Prior Publication Data

US 2003/0037011 A1 Feb. 20, 2003

(30) Foreign Application Priority Data

Aug. 16, 2001 (JP) .................................... P2001-247499

(51) Int. Cl.$^7$ ............................................ G06F 17/60
(52) U.S. Cl. ............................ 705/67; 705/52; 705/65; 705/66; 705/73; 713/200; 713/194; 713/201; 713/182; 713/185; 713/186
(58) Field of Search ............................... 705/52, 64–79; 713/150, 182, 183–186, 194, 200, 201, 202

(56) References Cited

U.S. PATENT DOCUMENTS

| | | | | |
|---|---|---|---|---|
| 4,683,372 | A | | 7/1987 | Matsumoto ................. 235/492 |
| 5,162,989 | A | * | 11/1992 | Matsuda ........................ 705/1 |
| 6,131,090 | A | * | 10/2000 | Basso et al. .................. 706/23 |
| 2001/0018660 | A1 | * | 8/2001 | Sehr .............................. 705/5 |
| 2002/0087334 | A1 | * | 7/2002 | Yamaguchi et al. ........... 705/1 |

FOREIGN PATENT DOCUMENTS

| | | |
|---|---|---|
| DE | 19823731 A1 | 12/1999 |
| EP | 0908855 A2 | 4/1999 |
| EP | 0924657 A2 | 6/1999 |
| EP | 1074949 A1 | 2/2001 |
| JP | 2001-43190 | 2/2001 |
| JP | 2001-092786 | 4/2001 |
| WO | WO98/01820 | 1/1998 |
| WO | WO00/64093 | 10/2000 |

OTHER PUBLICATIONS

Sims et al., "Smart Cards and Biometrics: Your Key to PKI", Mar. 1, 1999, Linux Journal.*

* cited by examiner

Primary Examiner—James P. Trammell
Assistant Examiner—Jalatee Worjloh
(74) Attorney, Agent, or Firm—Jacobson Holman PLLC (57) ABSTRACT

The present invention is to provide a memory rental service system in an intelligent authentication unit, the system allowing an application operating entity to setup or change any application freely and easily at a reduced cost of operating the application. In other words, the system is to separately lease one or more specific areas of a memory in the intelligent authentication unit (IAU) for independently authenticating personal identification such as fingerprints, to one or more operators who operate specific applications. A write API distributed to the operator is used to write the contents such as data or a program written in a specific area, while a read/write API is used to authenticate personal identification so as to read the written contents such as the data or program stored in the specific area and operate the application specified by the APL.

9 Claims, 4 Drawing Sheets

MEMORY RENTAL SERVICE SYSTEM IN INTELLIGENT AUTHENTICATION UNIT

BACKGROUND OF THE INVENTION

1. Field of the Invention

The present invention relates to memory rental service in an intelligent authentication unit. In particular, the present invention relates to a memory rental service system that enables an operator getting the memory rental service to execute specific operations using authentication capabilities.

2. Description of the Related Art

As a security system for a computer system, a network system, or other devices, there is a fingerprint identification system that realizes authentication through fingerprint identification.

A conventional fingerprint identification system is of a scanner type. In this scanner type, fingerprint source data may be registered and stored in a personal computer, for example. Then, fingerprint data of a person is entered from a fingerprint identification device connected to the personal computer, compared with the fingerprint source data stored in the personal computer, and when both accord, the fingerprint identification is authenticated.

Another conventional fingerprint identification system is of a data carrier type. In this data carrier type, fingerprint source data are registered and stored in a security memory of a smart card. Then, fingerprint data of a person is entered from a fingerprint identification device connected to a personal computer, compared with the fingerprint source data in the personal computer, and when both accord, the person is authenticated.

Still another conventional fingerprint identification system is of a next-generation type in which fingerprint source data registered are held in a security memory in a fingerprint identification token, and the fingerprint identification is also performed in the fingerprint ID token.

For example, a conventional technique related to such a fingerprint identification system is disclosed in Japanese unexamined patent publication No. 2001-43190, entitled "Authentication Use Terminal and Authentication System" and laid open on Feb. 16, 2001 (Applicant: Nippon Telegram and Telephone Corp.; Inventors: Adachi Takuya et al.).

Another conventional technique related to an electronic system using fingerprint identification is disclosed in Japanese unexamined patent publication No. 2001-92786, entitled "Portable Personal Identification Device and Electronic System to Which Access is Permitted by the Same Device" and laid open on Apr. 6, 2001 (Applicant: Mizobe Tatsuji et al.; Inventor: Sawaguchi Takashi).

However, since the above-mentioned systems or devices for personal authentication are to perform personal authentication according to a specific application, operators as application operating entities have not been allowed to set up a new application with some degrees of freedom or easily modify the application in operation.

In addition, it has been too expensive for the operator operating the application to come up with the money for the entire system on their own.

SUMMARY OF THE INVENTION

The present invention has been made in consideration of the above-mentioned circumstances, and it is an object thereof to provide a memory rental service system in an intelligent authentication device, which allows an application operating entity to set up or modify an application freely and easily so as to reduce the operating cost.

In solving the above-mentioned conventional problems and according to the present invention, there is provided a memory rental service system in an intelligent authentication unit. The memory rental service system includes an authentication unit having an IC card part for storing plural files, and a fingerprint identification part with a fingerprint sensor, the fingerprint identification part allowing access to a specific file of the IC card part when fingerprint identification is authenticated. The memory rental service system in an intelligent authentication unit also includes an application for a write system and a terminal application, in which when the specific file of the IC card part is serviced as a memory rental, the application outputs to the authentication unit the contents written in the file, the file number, and information for accessing the file, and the terminal application outputs to the authentication unit the file number and the information for accessing the file to read the contents written in the file corresponding to the file number concerned so as to start a specific application. In this structure, when the written contents, the file number, and the information for accessing the file are inputted into the authentication unit via the application for the write system, personal authentication is performed. Then, when the authentication result is true, the contents written in the file is written. On the other hand, when the file number and the information for accessing the file are inputted from the terminal so that the written contents will be read out, personal authentication is performed as well. Then, when the authentication result is true, the contents written in the file are outputted to the terminal application. Thus, when getting the rental service of part of the memory of the IC card part, an application operating entity can set or change any application freely and easily. In addition, since the authentication unit is distributed by an operator other than the one who gets the rental service, the operator who gets the rental service can reduce the application operating cost.

Further, according to the present invention, the memory rental service system for an intelligent authentication unit can be applied to any other system such as to turn on or off a car lock and crank the engine, or turn on or off a door lock, or buy a lottery ticket. It enables application operating entities to increase flexibility of making use of the applications.

DESCRIPTION OF REFERENCE NUMERALS

1 . . . IAU, 1a . . . Fingerprint Identification part, 1b . . . IC Card Part, 2 . . . Write System, 2' . . . Car Dealer's Key Number-Writing Terminal, 3 . . . User Terminal, 3" . . . Terminal, 4 . . . Servier, 4' . . . Lottery Number Storage Server, 5 . . . DB, 6 . . . Terminal, 11 . . . Common Control Part, 12 . . . Fingerprint Identification Part, 13 . . . FACCT, 14 . . . Fingerprint sensor, 15 . . . MF, 16 . . . DF, 16a . . . Rented area, 21 . . . APL, 22 . . . Write API, 31 . . . APL, 32 . . . Read/Write API, 33 . . . Car Control Part, 34 . . . Infrared Light-Emitting and Receiving Part, 35 . . . Door Lock, 36 . . . Engine, 61 . . . Infrared Light-Emitting and Receiving Part

DETAILED DESCRIPTION OF THE PREFERRED EMBODIMENT

Referring now to the accompanying drawings, an embodiment of the present invention will be described.

A memory rental service system in an intelligent authentication unit according to the embodiment of the present invention is to lease one or more specific areas of a memory in the intelligent authentication unit for independently authenticating fingerprints or the like, separately to one or more operators who operate specific applications. In this system, written contents such as data or a program are written to a specific area or areas using a write application distributed to each operator. Then, personal authentication is performed using a read/write application distributed to the operator, and the written contents such as the data or program stored in the specific area or areas are read out to start a specific application.

Thus, an application operating entity who got the rental service related to the specific area or areas in the memory is at liberty to store the data or program in the specific area or areas. Then, after using authentication capabilities of the intelligent authentication unit, the operating entity can start any specific application prepared on its own. It enables the operating entity to update or do any other processing for data or the like in the specific areas of the rented memory.

On the other hand, the renter is allowed to separately lease plural memory areas in the intelligent authentication unit to operators who get different rental services. It should be noted that writing to each area can only be done with the write application distributed to each operator, while reading can only be done with the read/write application distributed to the operator. It disables the operator in an individual rental service to access any other memory area rented by another operator.

It will be described how to register and get the memory rental service prior to description of a specific configuration of the present invention.

An operator who gets the memory rental service needs to preset a necessary memory size and an option about whether to use an access method with authentication at the time of memory access, sign a contract, and pay a registration fee for each contract. This results in passing to the contracted memory a file number of the intelligent authentication unit, a write application (write API) with a write key (file access information), and a read/write application (read/write API) with the file number and a read/write key. The file access information (access keys) is information indicative of the location of a key to access the file.

The operator uses the write API to write data or a program to the rented memory area, and attaches the read/write API to a specific application to be executed.

Upon starting the specific application, if the system is such that the read/write API accesses the intelligent authentication unit to authenticate fingerprint identification or the like, the authentication will be performed before the operator uses the read/write key to read and output data or the like from the rented memory area. If the data or the like is correct, the specific application will be started.

Figure 1:
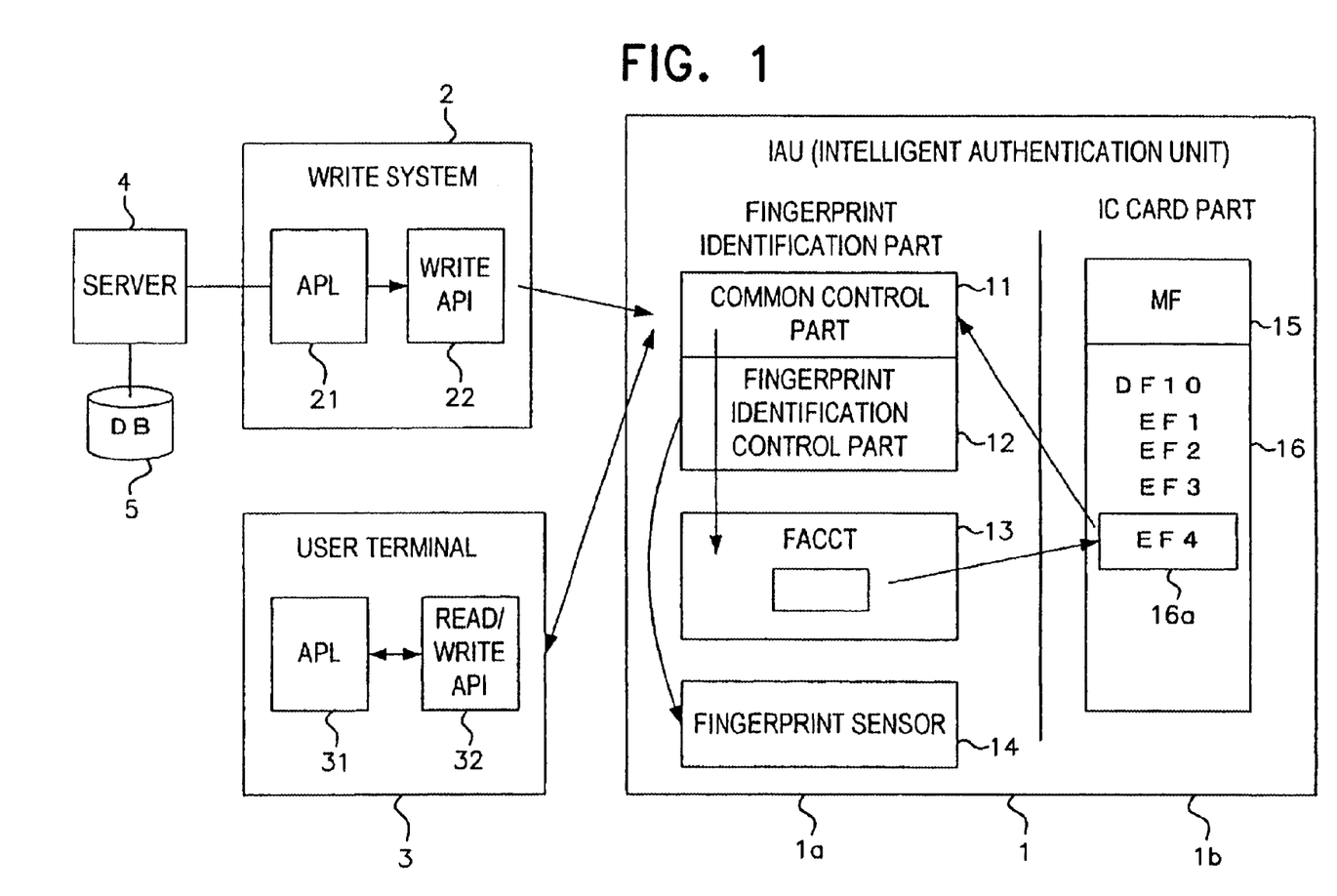
FIG. 1 is a schematic block diagram of a memory rental service system in an intelligent authentication unit according to an embodiment of the present invention.

Referring next to FIG. 1, the memory rental service system (the system) in an intelligent authentication unit according to the embodiment of the present invention will be described. FIG. 1 is a schematic block diagram of the memory rental service system in an intelligent authentication unit according to the embodiment of the present invention.

As shown in FIG. 1, the system is constituted of an intelligent authentication unit 1, a write system 2, and a user terminal 3. The write system is connected to a server 4, and the server 4 is connected to a database (DB) 5.

The intelligent authentication unit (IAU) 1 stores as templates personal fingerprint data, voiceprint data, and face image data. Upon access from the user terminal 3 to read data or a program stored in a specific area or areas (rented areas) in the memory, a check is made against the above-mentioned template data.

In one specific example, the check is made as follows: Fingerprints of the user are read by a fingerprint sensor of the IAU 1 in response to an access request from the user terminal 3, and compared with the fingerprint data in a template to authenticate personal identification.

Next, each part of the system will be specifically described.

The IAU 1 is a thin box-shaped such as an IC card, and is provided with a fingerprint sensor on the right side and a terminal of an external connection interface part on the reverse side, for example. The IAU 1 may have other shapes.

The IAU 1 is constituted of a fingerprint identification part 1a and an IC card part 1b.

The write system 2 is constituted of an application (APL) 21 for connecting the system 2 to the server 4 to obtain data or a program to be written into a rented area or areas, and a write application (write API) 22 for delivering various data to the IAU 1. The various data include information on the presence or absence of authentication as defined for each contract, an access file number (file No.), an access key (write key), and write data.

The write API 22 is distributed from the renter to an operator after the operator signs a contract for the memory rental service. The write API 22 holds information on the presence or absence of authentication, a file No. indicative of a rented area, and a write key.

The user terminal 3 is constituted of a specific application (API) 31 to be operated by the operator who got the rental service, and a read/write application (read/write API) 32 for delivering various data to the IAU 1 to read data or the like from a rented area. The various data include information on the presence or absence of authentication as defined for each contract, an access file No., and an access key (read/write key).

The read/write API 32 is distributed from the renter to an operator after the operator signs a contract for the memory rental service. The read/write API 32 holds information on the presence or absence of authentication, a file No. indicative of a rented area, and a read/write key as the access key. However, if the system is such that only the reading from the memory is done without writing to the memory, it will requires only the read key as the access key.

If memory read/write operations are performed, the number of accesses to the rented area in the memory or the number of points may be stored each time data is read from the rented area in the memory. In this case, read/write keys are necessary.

Next, an internal configuration of the IAU 1 will be specifically described.

The fingerprint identification part 1a is constituted of a common control part 11, a fingerprint identification control part 12, a file access control condition table (FACCT) 13, and a fingerprint center 14.

The common control part 11 receives the information on the presence or absence of authentication, a write file No., an access key or keys, data or a program, a macro, and the like, all of which are inputted from the write system 2. If personal authentication such as fingerprint identification is to be performed (in the case of the presence of authentication), instructions such as fingerprint identification are outputted to the fingerprint identification control part 12. On the other hand, if personal authentication such as fingerprint identification is not to be performed (in the case of the absence of authentication), the access key is outputted to the FACCT 13.

The fingerprint identification control part 12 is a one-chip microcomputer, in which a CPU, a program ROM, and a work RAM are incorporated, and on which a fingerprint identification control program and a program for the common control part 11 run.

The fingerprint identification control part 12 receives a fingerprint identification instruction from the common control part 11, accesses the FACCT 13 to obtain an encrypted key for opening a fingerprint template file in the IC card part 1b, and outputs the encrypted key to the IC card part 1b.

Upon receipt of the fingerprint template data from the IC card part 1b, the fingerprint identification control part 12 expands the data in the work RAM to compare the data with fingerprint data inputted from the fingerprint sensor 14. Then the fingerprint identification control part 12 outputs the comparison result to the common control part 11.

It should be noted that the fingerprint identification control part 12 may change the level of identification according to the level of security so that an identification judgment will be made according to the level of identification required by the application.

The FACCT 13 is a key table from which various files for use in the IC card part 1b are extracted. The keys are stored in an encrypted format, for example, according to DES (Data Encryption Standard) of common-key cryptography or RSA (Rivest Shamir Adleman) of public-key cryptography. The table is created on the unit provider side, and any change in the table cannot be made on the user side.

The fingerprint sensor 14 is a sensor for taking in fingerprint data. In the embodiment, a commercially available module is used to implement the fingerprint sensor 14.

The IC card part 1b allows the user to make various settings of file structure and for access control to the files. For example, the IC card part 1b is provided with a master file (MF) 15, a set (DF: Dedicate File) 16 of plural data files (EF: Elementary File), a fingerprint template file with fingerprint data on authorized users stored therein, a voiceprint/face template file with voiceprint data or face data on authorized users stored therein, and personal information part for storing personal information.

The IC card part 1b is connected to the common control part 11 through a serial interface, and the common control part 11 serves as a card reader for the IC card part 1b.

The structure of the IC card part 1b is the same as a general IC card. In the structure, an internal IC card CPU divides a memory into designated structural blocks so that the memory will be managed on a block basis. An individual key (access password) can be set for each block, and any access key such as read, write, or delete key can also be set.

The MF 15 has an encryption key for decrypting encrypted keys inputted. It should be noted that the encryption key is a common key commonly used for decrypting keys for access to the DF, the EF, the fingerprint template file, and the like. As a result, the encrypted keys obtained from the FACCT 13 with the encryption key of the MF 15 are decrypted so that data in the DF, the EF and the fingerprint template file can be read out using the decrypted keys.

The DF 16 has a file structure in which each of classified files DF0 to DFN has lower files EF1 to EFN. The files hold data or the like to be transmitted to the user terminal 3. It should be noted that access to each DF or EF needs a different key corresponding to the file.

In FIG. 1, EF 4 corresponds to a rented memory area 16a.

The fingerprint template file holds one or more fingerprint data on an authorized user or users. The fingerprint template is opened by the key decrypted in the MF 15 so that the fingerprint data will be outputted.

The voice/face template file holds registered voice/face data. The voice/face template file is opened by the key decrypted in the MF 15 so that the voice/face data will be outputted.

The personal information part is a part for storing personal information on a person who owns the unit. For example, a password for entrance into or exit from a laboratory may be stored in the personal information part.

The interface of the IAU 1 is, for example, of an ISO-7816 type, and an interface such as SIO, BlueTrue, or irDA is added to a device to which the IAU 1 is connected.

The user terminal 3 is also provided with an interface part corresponding to the interface of the device to which the IAU 1 is connected. The user terminal 3 is any type of device capable of running thereon an application requiring personal authentication, such as a personal computer, a home electric appliance connectable to the Internet, a cell phone, a car, a door system, and a safe.

Next, the operation of the system will be described.

Upon completion of a contract of the memory rental service, the contract contents are registered on the renter side. The contract contents include information on the presence or absence of authentication, a file number (file No.) of a rented memory area, an access key (write key or read/write key) to the file, and other optional data items.

Then, the renter distributes, to the operator (user) who gets the rental service, the write API 22 with the information on the presence or absence of authentication, the file No., and the write key in the access keys stored therein, and the read/write API 32 with the information on the presence or absence of authentication, the file No., and the read/write key in the access keys stored therein.

The user incorporates the write API 22 into the write system 2, and the read/write API 32 into the user terminal 3. Each API runs in synchronization with an application (APL).

The API 21 in the write system 2 obtains data or the like through the server 4 from the database (DB) 5 in which data or programs to be written to rented areas are stored, so that the write API 22 processes the data to write the same to the rented area concerned.

After the APL 21 inputs data to be written to the rented area, the write API 22 outputs, to the common control part 11 of the IAU 1, the information on the presence or absence of authentication, the file No., and the write key in the access keys, together with the input data.

The common control part 11 of the IAU 1 determines, based on the information on the presence or absence of authentication, whether or not personal authentication should be performed. When personal authentication should be performed, the common part 11 of the IAU 1 outputs to the fingerprint identification control part 12 an instruction of fingerprint identification, while it obtains fingerprint data from the fingerprint template file in the IC card part 1b. On the other hand, when personal authentication should not be performed, the common control part 11 extracts a key to allowing access from the FACCT 13 with the access key, and uses the extracted key to write data or the like to the file corresponding to the file No. concerned.

The fingerprint control part 12 compares fingerprint data inputted from the fingerprint sensor 14 with fingerprint data obtained from the fingerprint template file, and outputs the comparison result to the common control part 11.

When the comparison result from the fingerprint identification control part 12 is true, the common control part 11 extracts a key to allowing access from the FACCT 13 with the access key, and uses the extracted key to write data or the like to the file corresponding to the file No. concerned.

On the other hand, when the comparison result is false, the common control part 11 ends the processing.

The IAU 1 to which the data or the like has been thus written is mounted in an IAU-ready terminal such as a cell phone, a PDA, a personal computer, an electronic car key, or an electronic door key. It is assumed that the APL 31 corresponding to each application and the read/write API 32 for data or the like dedicated to each application have been installed.

Upon starting the APL 31, the APL 31 outputs to the read/write API 32 access instructions to the IAU 1.

The read/write API 32 outputs, to the common control part 11 of the IAU 1, internally stored data, such as the information on the presence or absence of authentication, the file No. and the read/write key in the access keys, in accordance with the instructions from the APL 31.

The common control part 11 determines, based on the information on the presence or absence of authentication, whether authentication should be performed. When authentication should be performed, the common control part 11 outputs an instruction of fingerprint identification to the fingerprint identification control part 12, while it uses the FACCT 13 to obtain fingerprint data from the fingerprint template file in the IC card part 1b. On the other hand, when authentication should not be performed, the common control part 11 extracts a key to allowing access from the FACCT 13 with the access key, and uses the extracted key to read data or the like from the file corresponding to the file No. concerned.

The fingerprint identification control part 12 compares fingerprint data inputted from the fingerprint sensor 14 with fingerprint data obtained from the fingerprint template file, and outputs the comparison result to the common control part 11.

When the comparison result from the fingerprint identification control part 12 is true, the common control part 11 extracts a key to allowing access from the FACCT 13 with the access key, and uses the extracted key to read data or the like from the file corresponding to the file No. concerned.

On the other hand, when the comparison result is false, the common control part 11 ends the processing.

The common control part 11 outputs the read-out data or the like to the read/write API 32 of the user terminal 3, then to the APL 31.

The APL 31 of the user terminal 3 executes a corresponding application to perform processing for the data or the like inputted. If a macro or program has been written in the rented area instead of data, the APL 31 executes the macro or program.

It should be noted that some or all of data, a macro and a program can be mixed in one rented area.

Further, the read/write API 32 may have functions for updating and deleting data in and from the rented area.

In addition to the data, any other information such as the number of accesses or the number of points can also be stored in the rented area.

In this case, the read/write API 32 internally manages the information on the number of accesses or the number of points, and reads the information when reading the data from the rented area. After that, the information on the number of accesses or the number of points that has been updated in the rented area is written. Checking such information on the number of accesses or the like in the read/write API 32 makes it possible to prevent counterfeiting.

The read/write API 32 may also store and manage any other information item as information for counterfeiting prevention, such as read count value or time and date items, or a random number. In such a case, a counter, timer, or the like is internally provided in the IAU 1 so that a count value of the counter, the time and date, or a random number will be written to the rented area. This makes it possible to compare the count value or the like written in the rented area with a count value of the counter in the read/write API 32, and hence prevent counterfeiting.

Figure 2:
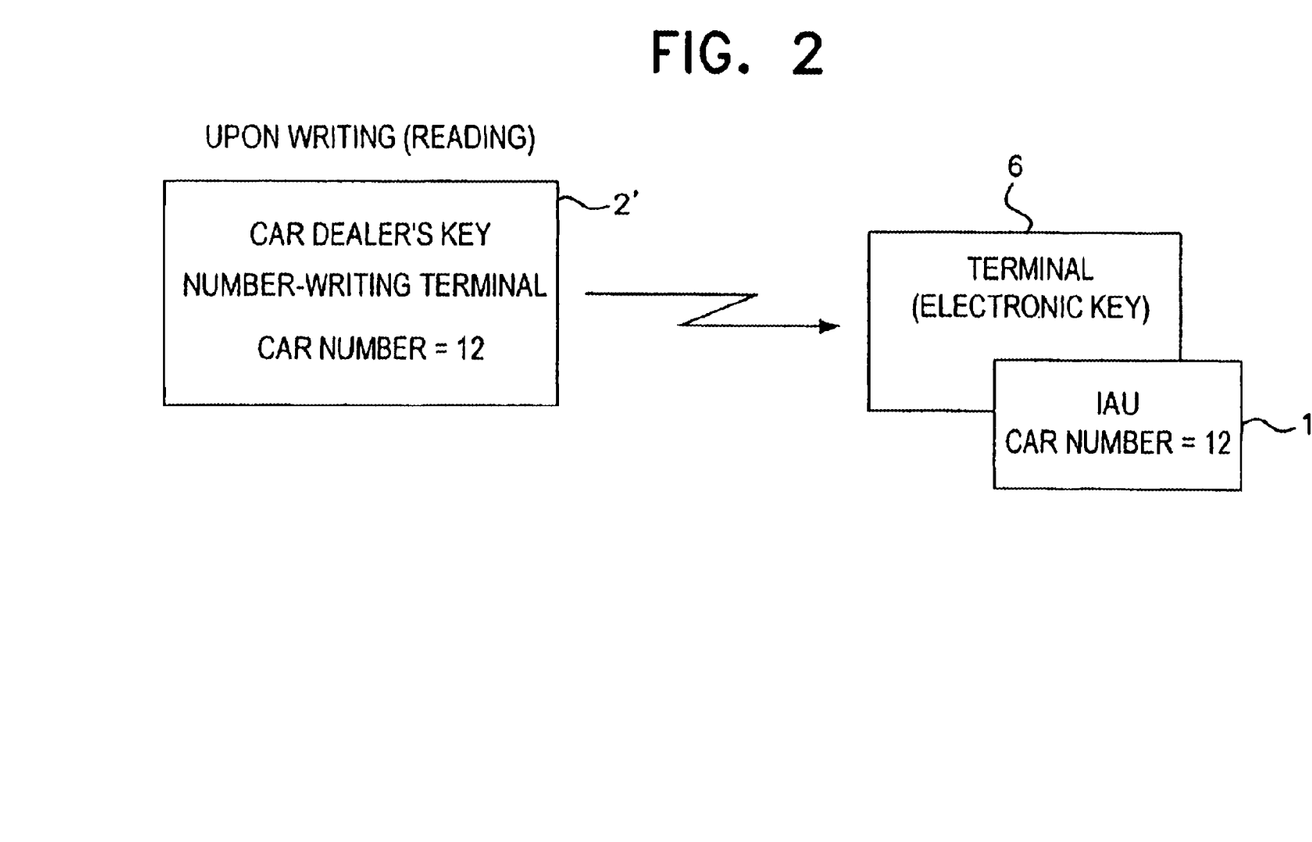
FIG. 2 is a schematic diagram showing memory writing to an electronic car key.
Figure 3:
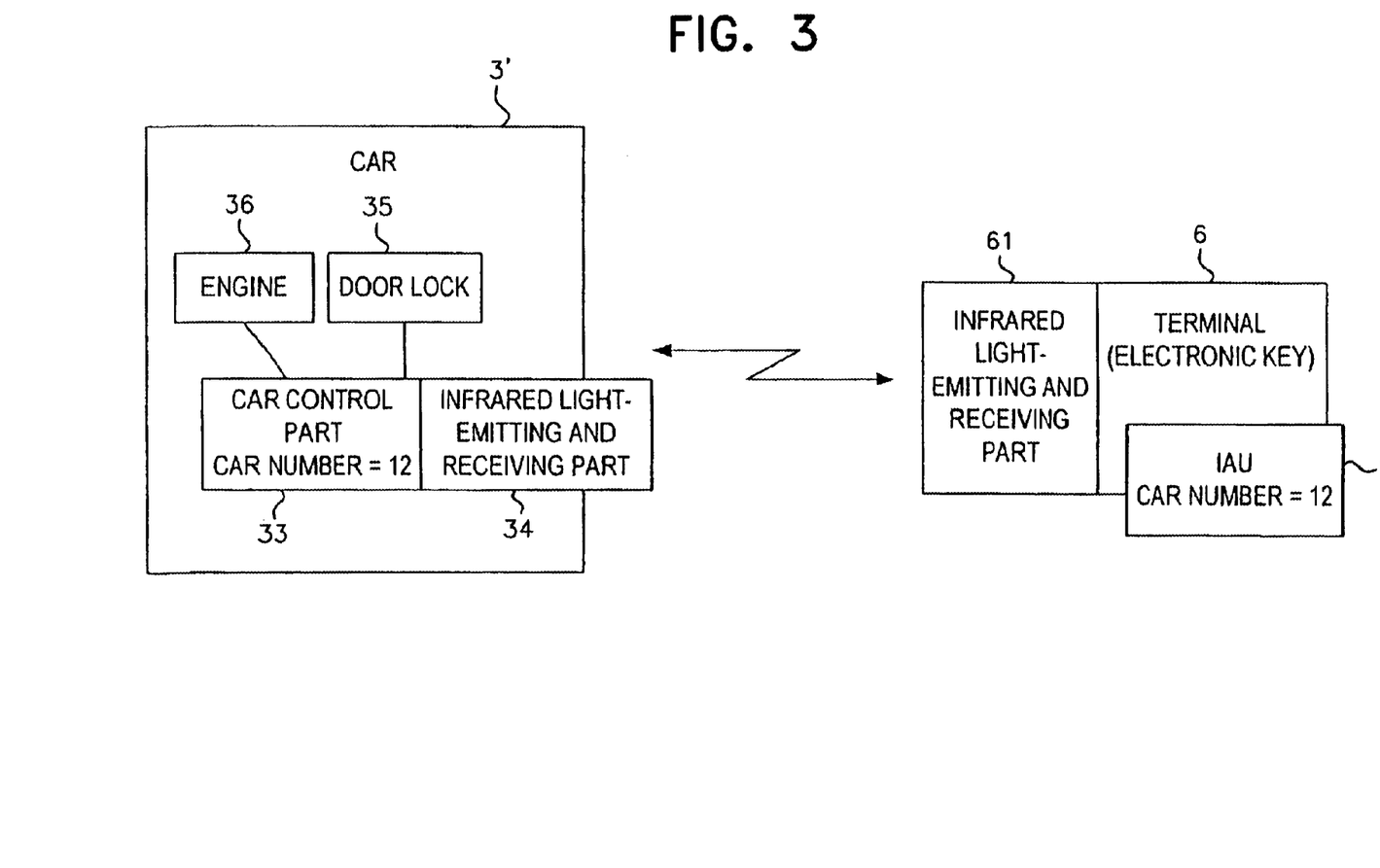
FIG. 3 is a schematic diagram showing memory reading to the electronic car key.

Referring next to FIGS. 2 and 3, an example application for the system will be described. FIG. 2 is a schematic diagram showing a memory write operation to an electronic car key, and FIG. 3 is a schematic diagram showing a memory read operation from the electronic car key.

As shown in FIG. 2, a car number is written into the IAU 1 using a car dealer's key number-writing terminal 2' as the write system 2 and a terminal (electronic key) 6. It should be noted that the car dealer's key number-writing terminal 2' is connected to a server, not shown, for managing car numbers.

On the other hand, as shown in FIG. 3, a car number is read from the IAU 1 using a car 3' corresponding to the user terminal 3, and the terminal (electronic key) 6.

Here, since communication between the car 3' and the terminal (electronic key) 6 is carried out by infrared signals, each unit is provided with an infrared light-emitting and receiving part 34 or 61.

Since the car 3' is also provided with an engine 36 and a door lock 35, a car control part 33 is connected to the infrared light-emitting and receiving part 34.

Next, the operation of the example application to the car electronic key will be described.

The car key is assigned a key number (key number=car number) uniquely given to each car. All the key numbers are managed in the server or DB, while each key number is stored in the car control part 33 of the car concerned. When the car is purchased, the key number (car number) is written into a file corresponding to a file No. of the IAU 1 about which the car dealer has made a contract with a licenser.

The process to write a car number is carried out as follows: The server obtains a uniquely-defined key number from the DB, and outputs the key number to the car dealer's key number-writing terminal 2'. Since the write API 22 is provided in either the car dealer's key number-writing terminal 2' or the terminal (electronic key) 6, the information on the presence or absence of authentication, the file No., and the access keys, all of which have been distributed at the time of the contract, are outputted to the IAU 1 together with the key number.

It enables personal authentication as required and writing of the licensed file No. and the key number (car number).

The process to read the car number is carried out as follows: When instructions to turn the door lock on or off, and crank the engine is outputted from the terminal (electronic key) 6 to the car 3', the car control part 33 makes a request for reading the car number from the IAU 1 wireless-connected to the terminal (electronic key) 6 through the infrared light-emitting and receiving part 34. Since the car control part 33 is provided with the APL 31 and the read/write API 32, it outputs the information on the presence or absence of authentication, the file No., and the access keys to the IAU 1 so that authentication will be performed in the IAU 1 as required to read the key number from the file corresponding to the file No. concerned. The read-out key number is inputted into the car control part 33 by an infrared signal. The car control part 33 compares the prestored car number with the car number received by the infrared signal, and performs the above-mentioned operation only when the car numbers match with each other.

Thus, the IAU 1 is mounted on such an IAU-ready electronic key, and the can number is transmitted by the infrared signal to the car body after personal identification is authenticated, so that the door lock is opened and the engine is cranked. It has the effect of preventing theft.

The IAU with the car number written therein may be mounted on any terminal such as a cell phone other than the electronic car key, and used via the APL running on the terminal. In this case, the terminal such as a cell phone is a source device, and a receiving unit that communicates with the source device is mounted in the car, such that signals received at the receiving unit are inputted to the car control part 33.

Although the example of FIGS. 2 and 3 is to operate the door and engine of a car, such a system can also be applied to open or close a house door or safe.

Figure 4:
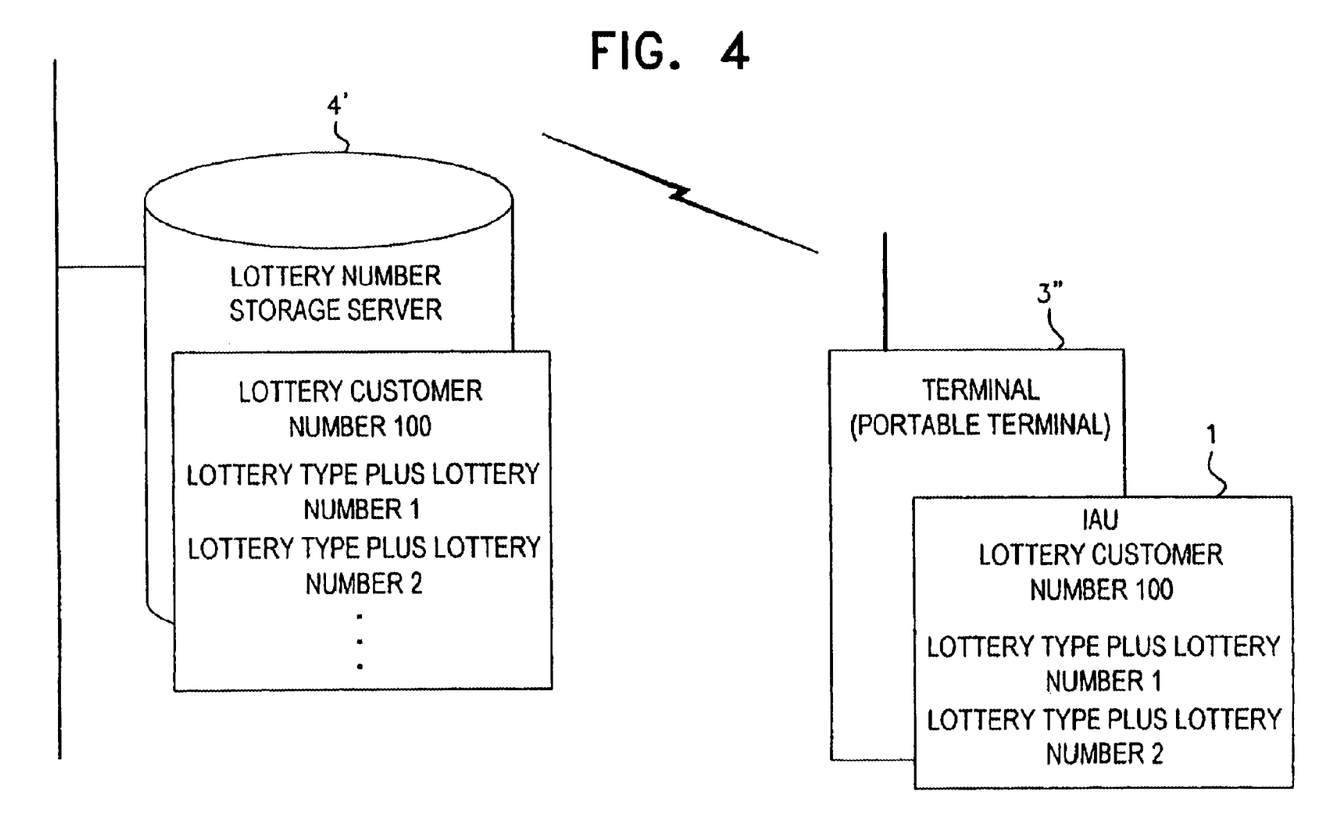
FIG. 4 is a schematic diagram showing an example application to a lottery system.

Referring next to FIG. 4, an example application for the system to a lottery system. FIG. 4 is a schematic diagram showing an example application to a lottery system.

As shown in FIG. 4, the example application is basically constituted of a lottery number storage server 4' and a terminal (cell phone) 3" in which the IAU 1 is mounted.

A lottery ticket dealer performs user registration in advance, and assigns a customer number to an IAU 1 by specifying the number of an account to which money for buying a lottery ticket is charged or a prize of lottery may be transferred. Upon the user registration, personal authentication is performed such as fingerprint identification. When a customer buys a lottery ticket on the terminal 3", a lottery type plus lottery number transmitted from the server is written into a memory part of the IAU 1 corresponding to the customer number. Then, a payment is made. For the process of buying the lottery ticket, personal authentication is performed as well.

The lottery number storage server 4' stores the lottery type plus lottery number in association with the customer number upon which the customer bought the lottery ticket.

The customer who bought the lottery ticket can browse or confirm the customer-owned lottery number stored in the lottery number storage server 4' on the precondition that the customer identification is authenticated.

On the date of announcement of winning numbers, the lottery number storage server 4' searches for lottery types and lottery numbers of winners, and informs the winners of the winning lottery types and numbers by e-mail, and processes data so that prizes will be automatically transferred to the registered accounts of the winners respectively. It enables the lottery dealer to transfer prizes on the date of announcement of winning numbers, and the winners not to forget to receive the prizes.

The example application to the lottery system can also be applied to any other public gambling system.

According to the system, part of the memory of the IAU 1 is leased to an operator as an application operating entity to enable the operator to execute any application in conjunction with authentication capabilities. It allows the application operating entity to set up or change the application freely and easily.

Also, according to the system, the intelligent authentication unit is distributed by a business entity, such as a bank, a credit company, or a cellar phone company, other than the operator who gets the rental service. Since the operator who gets the rental service can use the authentication capabilities at no cost of manufacturing and distributing the IAU 1, the application operating cost can be reduced. Further, since the IAU 1 is distributed by a bank, a credit company, or a cellar phone company, it is conceivable that the operator could jointly undertake the market of the IAU distributing company, which means great savings in trying to cultivate a new market.

Further, according to the system, plural areas in the memory of the IAU 1 can be separately leased to plural application operating entities. In this case, since access to an area can only be done with the write API 22 and the read/write API 32 distributed to the operator concerned, any operator cannot access memory areas allocated to other operators, which ensures security for each company.

As described above and according to the present invention, the memory rental service system in an intelligent authentication unit includes an authentication unit having an IC card part for storing plural files and a fingerprint identification part with a fingerprint sensor, the fingerprint identification part allowing access to a specific file of the IC card part when fingerprint identification is authenticated. The memory rental service system in an intelligent authentication unit also includes an application for a write system and a terminal application, in which when the specific file of the IC card part is serviced as a memory rental, the application for the write system outputs to the authentication unit the contents written in the file, the file number, and information for accessing the file, and the terminal application outputs to the authentication unit the file number and the information for accessing the file to read the contents written in the file so as to start a specific application. In this structure, when the written contents, the file number, and the information for accessing the file are inputted into the authentication unit via the application, personal authentication is performed. Then, when the authentication result is true, the contents written in the file are written. On the other hand, when the file number and the information for accessing the file are inputted from the terminal application so that the written contents will be read out, personal authentication is performed as well. Then, when the authentication result is true, the contents written in the file are outputted to the terminal application. Thus, when getting the rental service of part of the memory of the IC card part, an application operating entity can set up or change any application freely and easily. In addition, since the authentication unit is distributed by an operator other than the one who gets the rental service, the operator who gets the rental service can reduce the application operating cost.

Further, according to the present invention, the memory rental service system in an intelligent authentication unit can be applied to any other system such as to turn on or off a car lock and crank the engine, or turn on or off a door lock, or buy a lottery ticket. It enables application operating entities to increase flexibility of their activities.

What is claimed is:

1. A memory rental service system in an intelligent authentication unit, comprising:

an authentication unit having an IC card part for storing plural files and a fingerprint identification part with a fingerprint sensor, the fingerprint identification part allowing access to a specific file of the IC card part when fingerprint identification is authenticated;

an application for a write system in which when the specific file of the IC card part is serviced as a rented memory, said application outputs to said authentication unit the contents written in the file, the file number, and information for accessing the file; and a terminal application for outputting to said authentication unit the file number and the information for accessing the file to read the contents written in the file so as to start a specific application, wherein when the written contents, the file number, and the information for accessing the file are inputted into said authentication unit via said application for the write system, personal authentication is performed, and when the authentication result is true, the contents written in the file is written, while when the file number and the information for accessing the file are inputted from said terminal application so that the written contents will be read out, personal authentication is performed as well, and when the authentication result is true, the contents written in the file are outputted to said terminal application.

2. The system according to claim 1, wherein authentication upon writing the contents written in the file and/or authentication upon reading out the written contents is optional.

3. The system according to claim 1, wherein said application for the write system, which holds the file number related to the memory rental and the information for accessing the file, and outputs the written contents, the file number, and the information for accessing the file to said authentication unit, is distributed from a renter and incorporated in the write system.

4. The system according to claim 1, wherein said terminal application, which holds the file number related to the memory rental and the information for accessing the file, and outputs the file number and the information for accessing the file to said authentication unit to read out the written contents, is distributed from a renter and incorporated in the write system.

5. The system according to claim 1, wherein the contents written in the file related to the memory rental include some or all of data, a program, and a macro, and further include some or all of the number of accesses, the number of points, a count value, and the time and date.

6. The system according to claim 5, wherein when the contents written in the file related to the memory rental include the number of accesses, the number of points, a count value, and/or the date, said terminal application writes these pieces of information in addition to reading thereof.

7. The system according to claim 1, wherein when the written contents written by the write system include a car number, and a wireless-communicable electronic key on which said authentication unit is mountable is used, said system further comprises a car control part for turning on or off a door lock and/or crank an engine when the car number received from a car body by radio communication is correct.

8. The system according to claim 1, wherein when the written contents written by the write system include a specific number, and a wireless-communicable cell phone on which said authentication unit is mountable is used, said system further comprises a control part for turning on or off a door lock when the specific number received on the door side by radio communication is correct.

9. The system according to claim 1, wherein when a customer registration is done by specifying an account to which money for buying a lottery ticket is charged and a prize of lottery may be transferred, a customer number is written in the written contents, while when a wireless-communicable portable terminal on which said authentication unit is mountable is used to buy a lottery thicket, a lottery number storage server stores a lottery type and lottery number to a file corresponding to the customer number as well as writing the lottery type and lottery number into said authentication unit, whereby the money for buying the lottery ticket is charged to the account, and if the customer wins, the lottery number storage server informs the winner of the win and transfers the prize to the account.

* * * * *